United States Patent [19]
Lance et al.

[11] Patent Number: 5,473,235
[45] Date of Patent: Dec. 5, 1995

[54] MOMENT CELL COUNTERBALANCE FOR ACTIVE HAND CONTROLLER

[75] Inventors: Wayne E. Lance, Largo; Jeffrey W. Hegg, North Redington Beach, both of Fla.

[73] Assignee: Honeywell Inc., Minneapolis, Minn.

[21] Appl. No.: 171,548

[22] Filed: Dec. 21, 1993

[51] Int. Cl.⁶ .................................................. G05B 11/01
[52] U.S. Cl. .................... 318/561; 318/568.17; 318/628; 318/632; 74/471 XY
[58] Field of Search ..................................... 318/560–650; 74/471 XY, 491, 523; 244/223, 228, 236, 237, 234; 200/1–6; 901/1, 3, 5, 7, 9, 12, 13, 15, 22, 34

[56] References Cited

U.S. PATENT DOCUMENTS

| | | | |
|---|---|---|---|
| 3,270,260 | 8/1966 | Mehr | 317/255 |
| 3,296,882 | 1/1967 | Durand | 74/471 |
| 3,409,252 | 11/1968 | Miller | 244/83 |
| 3,771,037 | 11/1973 | Bailey, Jr. | 318/580 |
| 4,095,763 | 6/1978 | Builta | 318/565 |
| 4,150,803 | 4/1979 | Fernandez | 74/471 XY |
| 4,531,080 | 7/1985 | Nordstrom et al. | 318/628 |
| 4,555,960 | 12/1985 | King | 74/471 XY |
| 4,661,032 | 4/1987 | Arai | 318/568 |
| 4,837,734 | 6/1989 | Ichikawa et al. | 364/513 |
| 5,107,080 | 4/1992 | Rosen | 200/6 A |
| 5,116,180 | 5/1992 | Fung et al. | 74/471 XY |
| 5,142,931 | 9/1992 | Menahem | 74/471 XY |

*Primary Examiner*—Paul Ip
*Attorney, Agent, or Firm*—Gregory A. Bruns

[57] ABSTRACT

An active hand controller system includes a moment cell for generating a signal representative of the force or torque applied to the stick of the hand controller by a user. The moment cell has an internal center of rotation and distributed masses are used to counterbalance the effect of inertial forces on the stick of the hand controller.

13 Claims, 7 Drawing Sheets

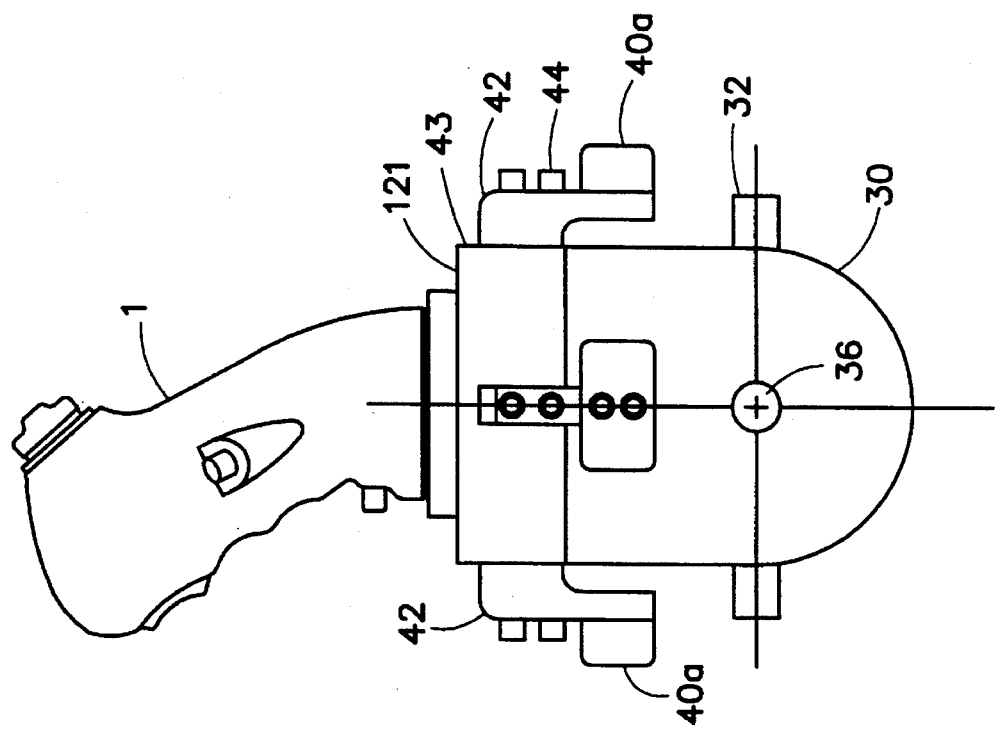
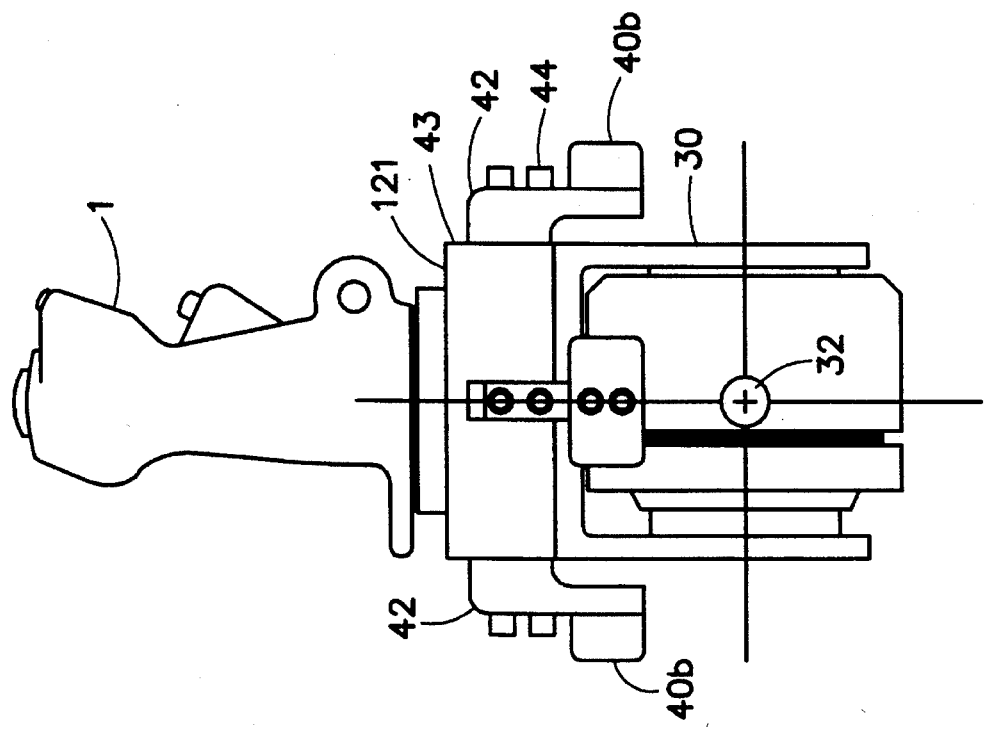

100

MOMENT CELL COUNTERBALANCE FOR ACTIVE HAND CONTROLLER

CROSS-REFERENCE TO RELATED APPLICATIONS

This invention is related to allowed application Ser. No. 07/957,278, now U.S. Pat. No. 5,264,768, having the same assignee as the present application.

BACKGROUND OF THE INVENTION

This invention relates generally to a control system of the type wherein manual control devices such as a control stick are provided which have an electro simulated variable force versus displacement characteristic, referred to herein as variable rate feel. Hand controller systems having this electro simulated variable rate feel are commonly referred to as active hand controllers. The related invention referenced hereinbefore utilizes electric motors to produce desired hand controller force and position response. These systems require sensors which can provide accurate and stable information about the position of the hand grip and the force or torque exerted upon the hand grip by the operator. The present invention relates specifically to a force sensor or moment cell capable of providing force information as described in application Ser. No. 07/957,278, now U.S. Pat. No. 5,264,768. The present invention allows such a force sensor to be used in an environment such as an aircraft or spacecraft where significant acceleration forces may be encountered.

FIG. 1 illustrates a passive or spring centered hand controller 12 of the type found in the prior art including hand grip 14, shaft 16, gimbal 18, and position resolver 20, shaft 22, arm 23 and spring arrangement 24. In the single degree of freedom arrangement shown, gimbal 18 allows rotational motion of the hand controller 12 about an axis parallel to shaft 22. It is well known that if hand controller 12 is to be used in an environment where significant acceleration will be experienced, then a counterweight 26 must be provided. Counter weight 26 is typically a weight attached to gimbal 18 and sized to statically balance gimbal 18, including hand grip 14 and shaft 16 so that no net torque about shaft 22 will be generated by longitudinal acceleration.

In some active hand controller systems, the counterbalance approach just described may not be necessary due to the capability of the active feedback system to resist any unbalanced gimbal force. The elimination of gimbal counterweight 26, where this is possible, provides a weight savings that is especially advantageous in aircraft applications. There is a need, however, to balance inertial forces which the active hand controller does not inherently balance, for example, where the hand controller has an axis of rotation displaced from the gimbal axis of rotation, as is the case with the moment cell described hereinbefore. In the present design concepts for an active hand controller utilizing the moment cell and having two degrees of freedom, i.e., pitch and roll, there is no space available directly beneath the moment cell for a counterweight. Thus a need exists for a device to balance the inertial forces associated with the moment cell previously described.

SUMMARY OF THE INVENTION

The present invention solves these and other needs by providing an improvement in an active hand controller system of the type wherein a manual input control stick has its position detected to generate a position signal, and its rate, i.e., force versus displacement, detected to generate a rate signal. In addition, a moment cell having an internal axis of rotation detects force or torque exerted on the manual control stick by a user and provides a force signal. The control electronics accepts the position signal, the rate signal and force signal and provides a signal for having the motor exert a force on the manual control stick simulative of a mechanical hand control stick connected to a purely mechanical system. The improvement resides in providing counterbalance means for counterbalancing the effect on the moment cell of inertial forces on the manual control stick. The counterbalance means includes a plurality of individual weights distributed about the moment cell. The distributed weights may be secured to the moment cell by offset arms which may be selected to minimize hand controller power requirements.

BRIEF DESCRIPTION OF THE DRAWINGS

FIGS. 5a and 5b are front and side views illustrating the present invention.

DETAILED DESCRIPTION

Figure 1:
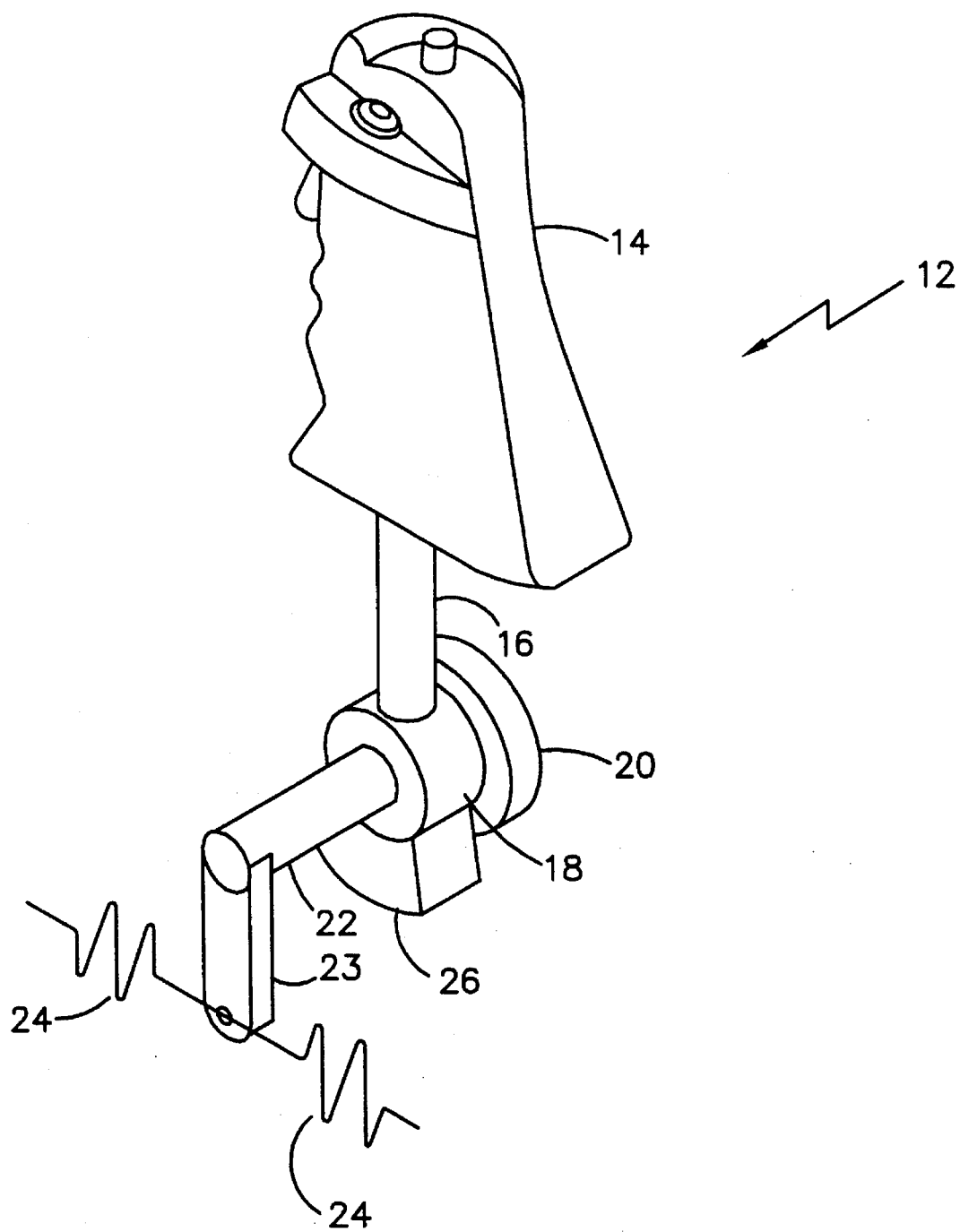
FIG. 1 is an isometric drawing of a passive hand controller as found in the prior art.
Figure 2:
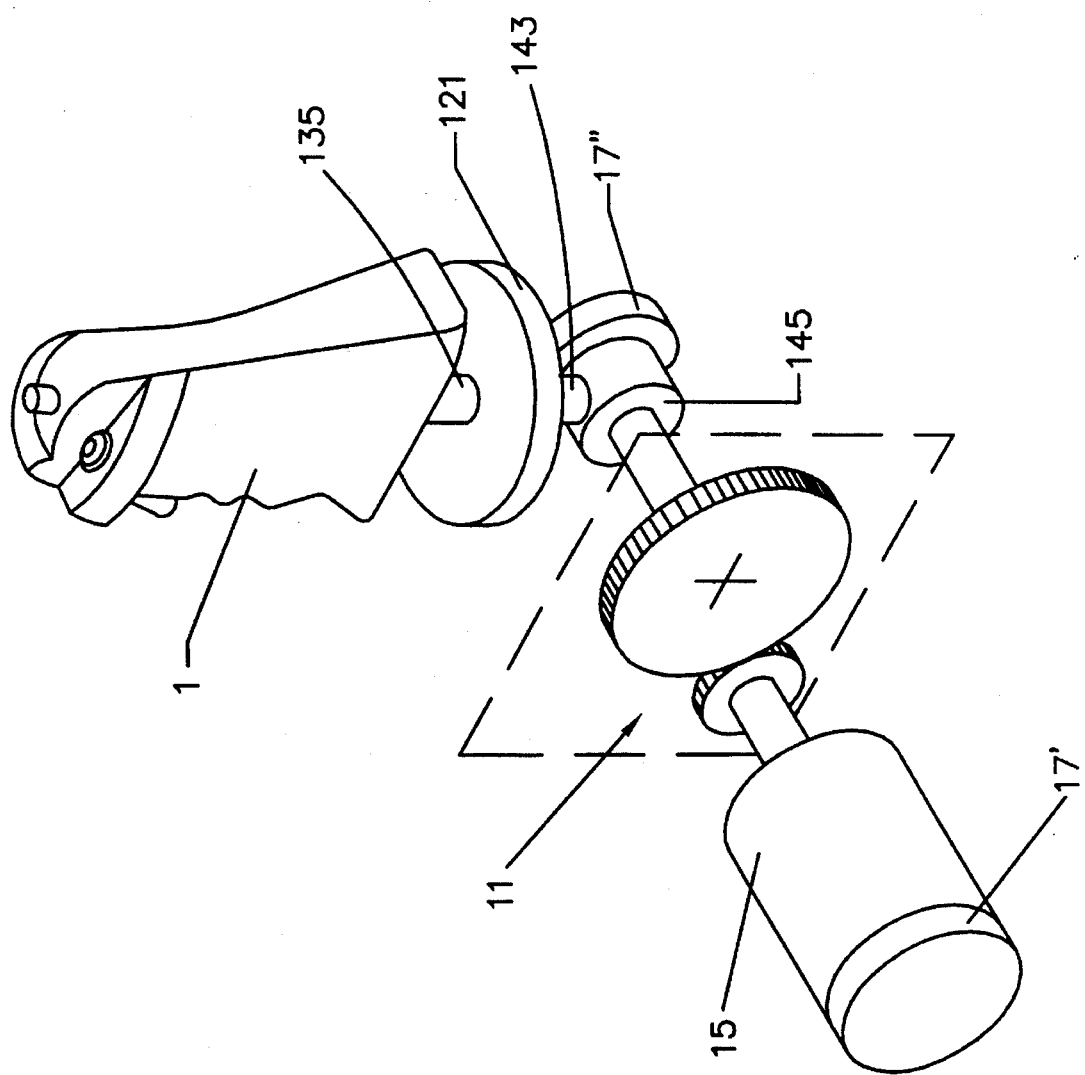
FIG. 2 is an isometric drawing of an active hand controller including a moment cell.

FIG. 2 illustrates an active hand controller arrangement as described in copending allowed patent application Ser. No. 07/957,278 which is hereby incorporated by reference. The same numeral designations are used in the present patent application where common to both applications. Hand controller arrangement of FIG. 2 includes hand grip 1 connected through rod 135 to control stick sensor (moment cell) housing 121 which itself includes rod 143 which is fixedly connected to gimbal 145. Gimbal 145 is connected by a shaft to gear head 11 which is connected to motor 15 which acts through gear head 11 to provide movement or apply a force to control stick 1 to simulate the force feel characteristics of purely mechanical systems. A motor and gear head are only shown for a single axis system, but it is understood that multiple motors and gear heads may be utilized for multiple axis systems.

Figure 3:
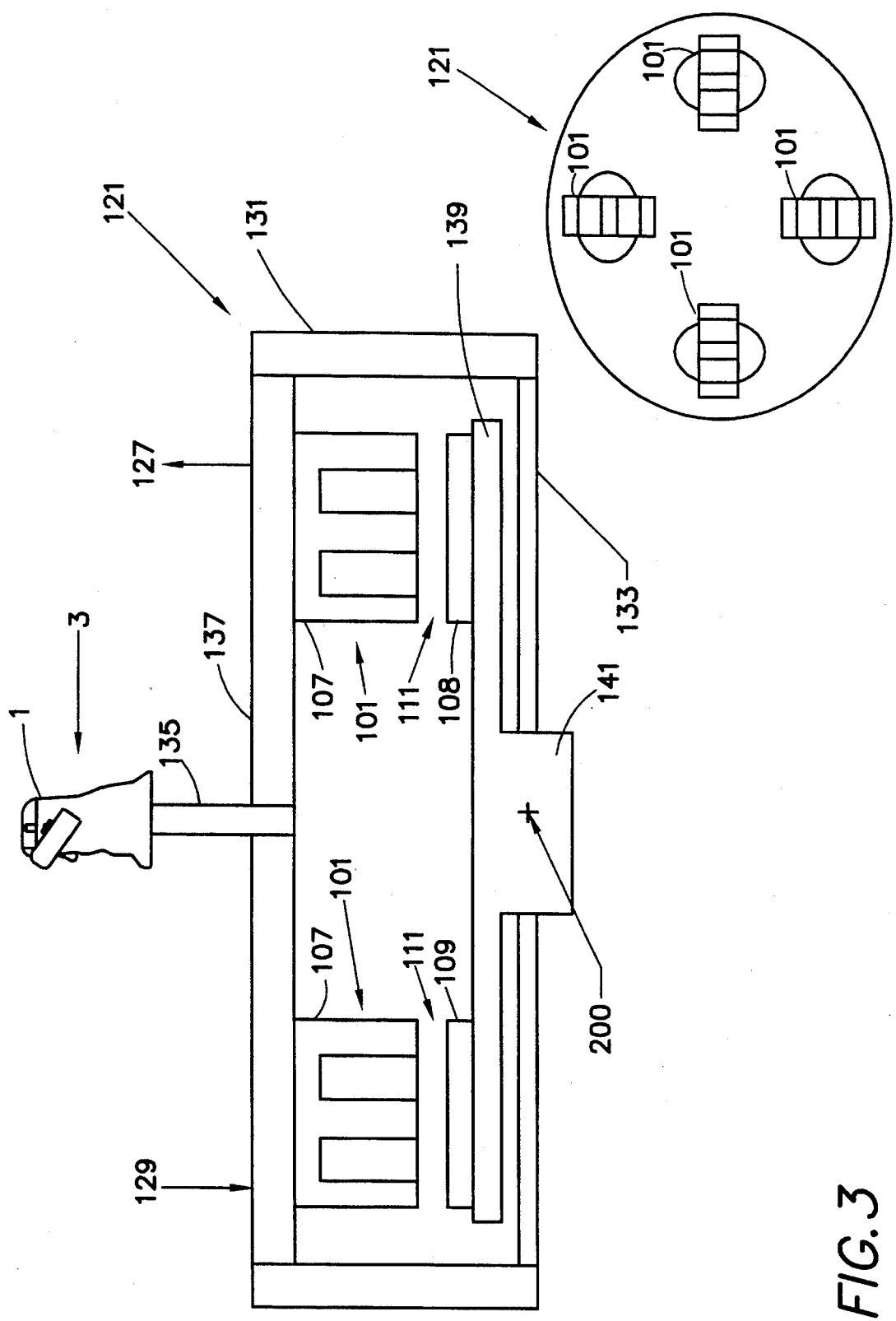
FIG. 3 is a cross section drawing of a moment cell.

FIG. 3 illustrates how variable reluctance transformers 101 can be employed in a push/pull arrangement such that when a force 3 is applied to control stick 1, the resulting downward motion 129 drives one of the transformer cores 111 downwards to narrow the air gap 111 with its return path 109 whereas an upward movement 127 separates its paired transformer core 107 to open up the corresponding air gap 111. In order to achieve this type of balanced push/pull effect, the control stick 1 is mounted on a rod 135 rigidly attached to an upper mounting member 137 making up part of the moment cell housing 121. The upper mounting member has a side wall 131 extending around the circumference thereof and the return paths 109 are rigidly mounted on a support member which is connected rigidly through rod 141 which extends to be fixedly attached to the gimbal mechanism (not shown) of the device of the invention. The bottom member 133 is a flexible diaphragm having a predetermined rigidity which flexes upon application of force 3 to control stick 1 to allow upward or downward movement of the cores 107 of the variable reluctance transformers 101.

As illustrated in FIG. 3, a force 3 applied to hand grip 1 causes moment cell housing 137 and 131 to tilt about a center of rotation 200 located approximately at the center of diaphragm 133. The motion of the housing is sensed differentially by transformers 101 and converted electronically into a force signal. If the assembly comprising hand grip 1 and moment cell 121 is subjected to linear acceleration perpendicular to rod 135, an inertial force would be generated by the mass of hand grip 1, and this force would be sensed by moment cell 121 as an operator applied force and would be converted into a force signal. This unintended force signal could cause the position of hand controller 1 to be changed by motor 15, leading to a corresponding change in the command signal going to the aircraft flight control system. This coupling of aircraft acceleration back into the flight control system signals is known as aeroservocoupling and is undesirable.

Figure 4:
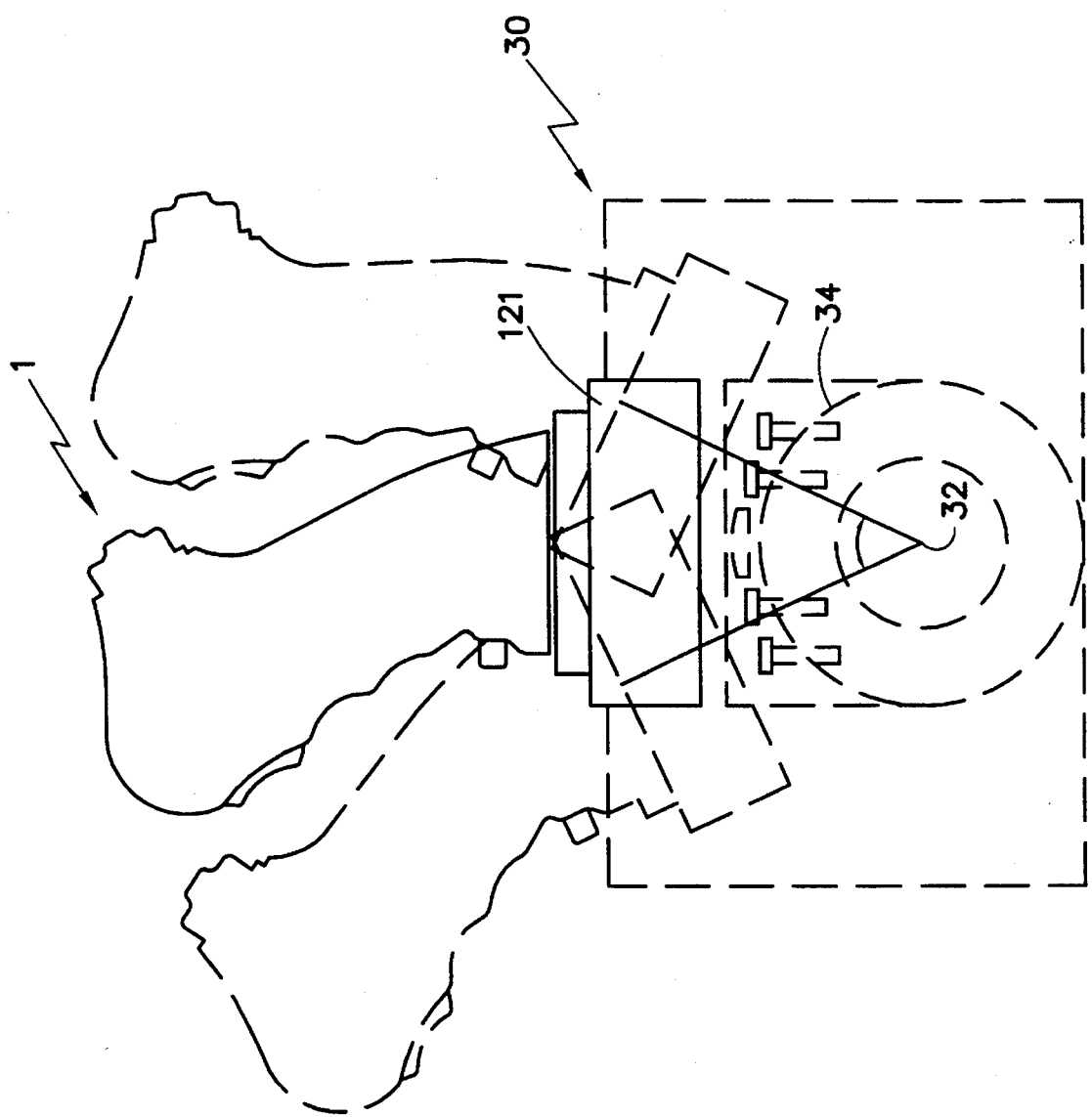
FIG. 4 is a partial cross-section drawing of a prototype design of an active controller having a moment cell with a portion of a gimbal assembly shown in phantom.

Present prototype designs of active hand controllers attempt to minimize the hand controller envelope in order to conserve critical aircraft cockpit space. An example of a prototype design is shown in FIG. 4 where control stick 1, moment cell 121, inner gimbal assembly 34 and gimbal assembly 30 are shown. A portion of gimbal assembly 30 along with control stick 1 and moment cell 121 rotates about axis 32 as shown. It is apparent that the prototype design does not allow sufficient space below moment cell 121, because of the gimbal arrangement located there, to provide a counterweight directly below moment cell 121.

Figure 6:
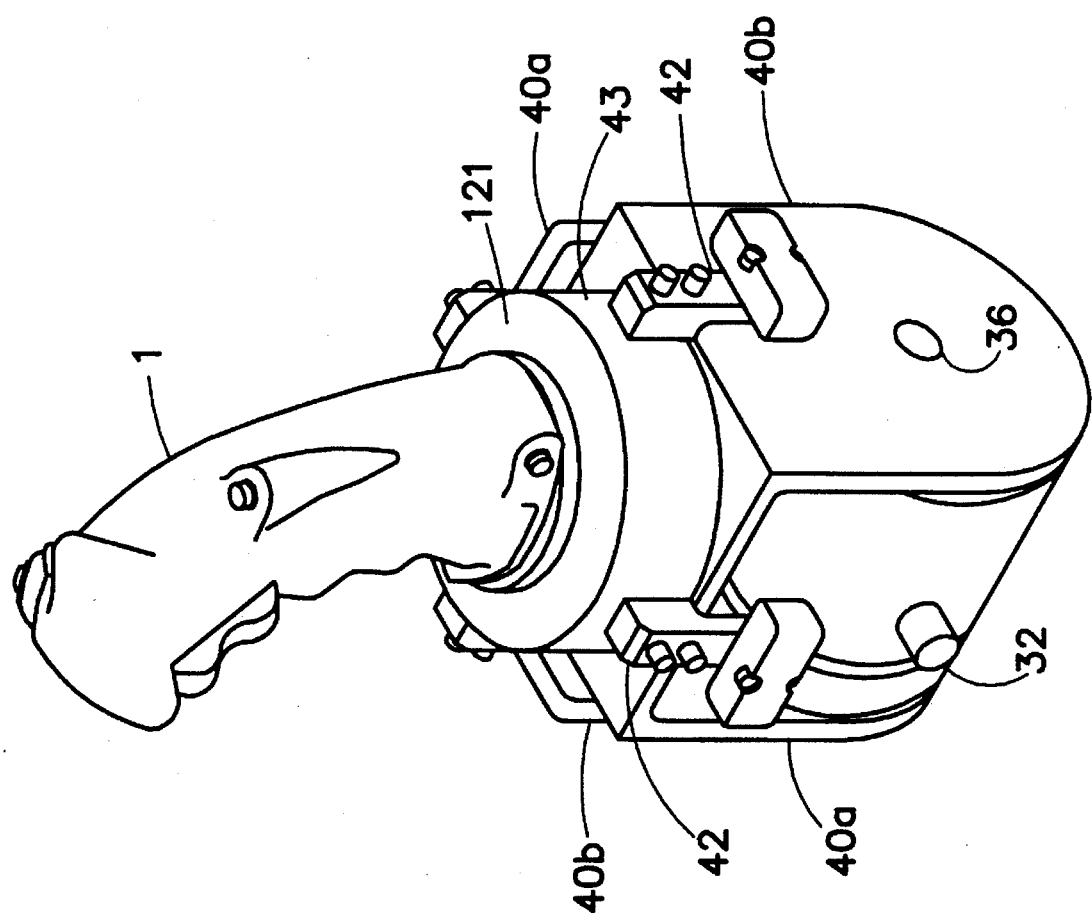
FIG. 6 is an isometric drawing illustrating the present invention.

FIGS. 5a and 5b illustrate the present invention with moment cell 121 located between hand grip 1 and gimbal 30. Gimbal 30 includes shaft 32 extending from inner gimbal assembly 34. Movement in a first plane about shaft 32 is movement about the roll axis. Movement in a second plane, perpendicular to the first plane, about axis 36 is movement about the pitch axis. In accordance with the present invention, pitch counter weights 40a and roll counter weights 40b are attached to the periphery 43 of moment cell 121 by offset arms or lever arms 42. The lengths of offset arms 42 should be selected based on a trade-off between the hand controller total mass and size envelope and power consumption. FIG. 6 illustrates weights 40a and 40b and lever arms 42 in an isometric drawing.

An important advantage of the present invention relates to power requirements. Active hand controllers have a dynamic response requirement, such as to be able to respond to pilot manual inputs at a specified minimum rate, for example, 3 Hz. Movement of the gimbal mass including the mass of pitch counter weights 40a and roll counter weights 40b requires a certain electrical power. The peak pitch power requirement is minimized by locating all counter weights 40a and 40b as close as possible to pitch axis 36. The peak roll power requirement is minimized by locating all counter weights 40a and 40b as close as possible to the roll axis 32. Axis 32 and axis 36 intersect, and the minimum total power requirement is realized when both pitch and roll counter weights can be located as close as possible to the intersection. Offset arms 42 may be selected to help minimize the power requirement.

In addition, applicants' invention will eliminate certain operational nonlinearities resulting from electromechanical connections of an active hand controlled system. Examples of these nonlinearities include friction and cogging forces.

Applicants' invention provides for a counterbalance while using the present compact design of FIG. 4 for gimbal assembly 30. A redesign of gimbal assembly 30 to allow room for a counterweight directly beneath moment cell 121 would necessarily increase the overall hand controller envelope which would cause an exponential increase in the power required to achieve a given force requirement.

Figure 7:
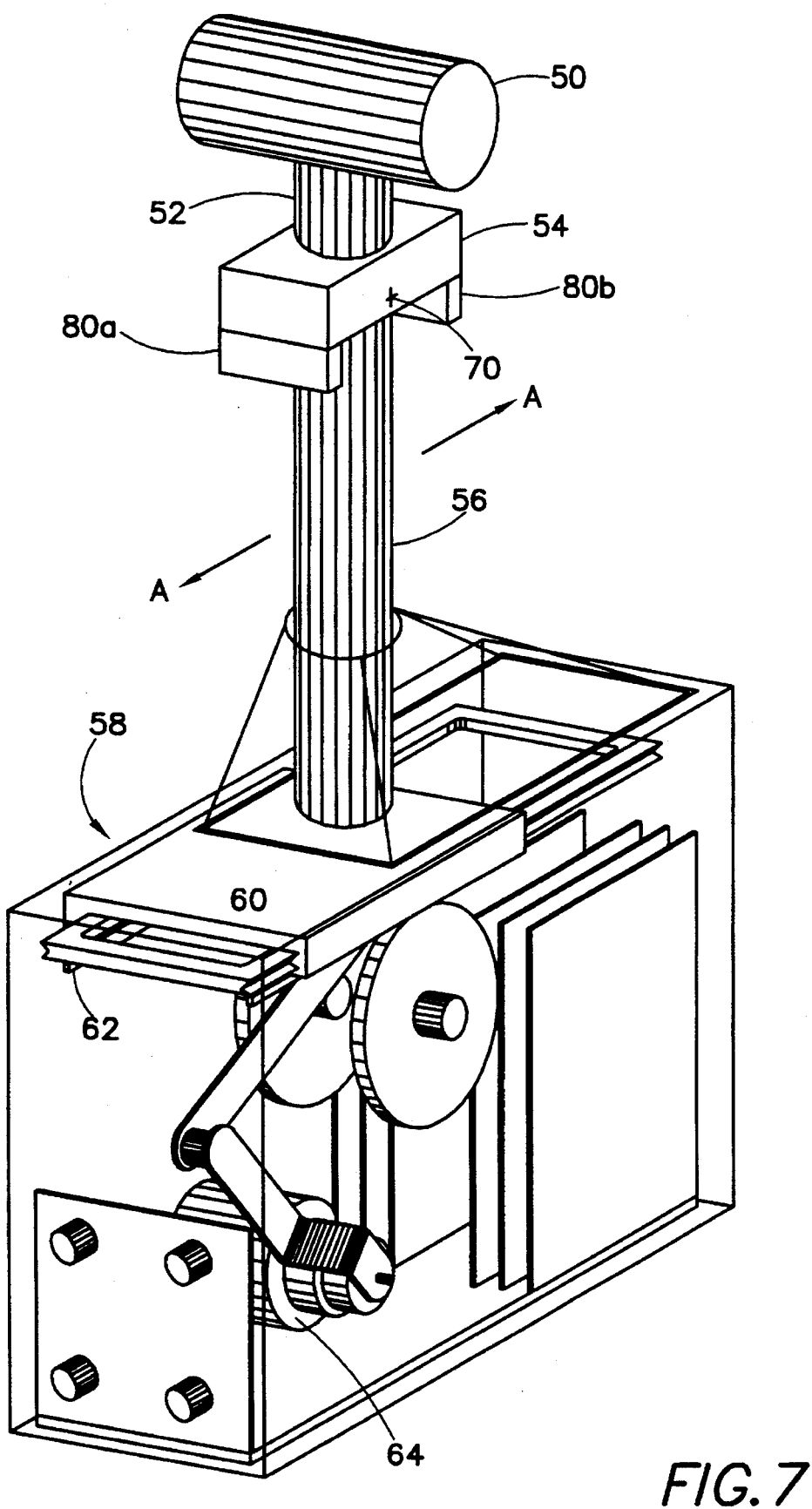
FIG. 7 is an isometric drawing with portions cutaway of a linear motion gimbal and a moment cell illustrating the present invention.

The present invention has been previously described herein relative to a rotary gimbal embodiment. The present invention is also applicable to a linear motion gimbal as illustrated in FIG. 7. The linear motion gimbal arrangement of FIG. 7 shows hand grip 50 connected through rod 52 to control stick sensor or moment cell 54 which is connected by rod 56 to linear motion gimbal 58. Gimbal 58 includes cross-axis bearing slider 60 and is arranged to couple linear movement of slider 60 to rotational movement of the shaft of actuator 64. The operation of moment cell 54 is generally as previously described herein. Movement of hand grip 50 is along a direction parallel to the direction indicated by arrow A—A in FIG. 7 which is movement in a single plane. Counterweights 80a and 80b in accordance with the present invention are used to balance the effect of inertial forces acting about a center of rotation which is designated as 70 in FIG. 7.

In accordance with the foregoing description, Applicants have developed a simple moment cell counterbalance that may easily be incorporated into the design of active hand controllers.

Although a specific embodiment of Applicant's invention is shown and described for illustration purposes, a number of variations and modifications will be apparent to those of ordinary skill in the relevant arts. It is not intended that coverage be limited to the disclosed embodiment, but only by the terms of the following claims.

We claim:

1. In an active hand controller system comprising manual control means for being controlled by a user by movement thereof in at least one plane, said manual control means connected through a gimbal to a shaft, said shaft connected to a motor for having said motor exert a force on said manual control means representative of a mechanical hand controller means, position detecting means for providing a position signal, rate detecting means for providing a rate signal, force detecting means connected to said manual control means and located between said manual control means and said gimbal, said force detecting means having an internal axis of rotation, said force detecting means for detecting a force exerted on said manual control means and for providing a force signal representative of said detected force, control means for accepting said position signal, said rate signal and said force signal and providing a motor control signal, the improvement comprising:

means for balancing inertial forces acting on said manual control means about said internal axis of rotation in said at least one plane.

2. Active hand controller system of claim 1 wherein said means for balancing said inertial forces comprises a plurality of individual weights spaced from said internal axis of rotation in a direction away from said manual control means.

3. Active hand controller system of claim 2 wherein said force detecting means is a moment cell and said plurality of individual weights are attached to said moment cell.

4. Active hand controller system of claim 3 further comprising individual lever arm means for attaching said individual weights to said moment cell.

5. Active hand controller system of claim 1 wherein said means for balancing comprises distributed counterbalance means.

6. Active hand controller system of claim 1 wherein said manual control means is pivotably mounted for angular motion in said first plane and for angular motion in a second plane, said second plane being perpendicular to said first plane.

7. Active hand controller system of claim 5 wherein said force detecting means is a moment cell and said means for balancing comprises a plurality of individual weights secured to said moment cell.

8. Active hand controller system of claim 7 wherein said individual weights are secured to said moment cell by lever arms.

9. In an active hand controller system comprising manual control means for being controlled by a user by movement thereof about at least one axis, said manual control means connected through a gimbal to a shaft, said shaft connected to a motor for having said motor exert a force on said manual control means representative of a mechanical hand controller means, position detecting means for providing a position signal, rate detecting means for providing a rate signal, control means for accepting said position signal and said rate signal and providing a motor control signal, force detecting means connected to said manual control means and located between said manual control means and said gimbal, said force detecting means having a second axis of rotation, said force detecting means for detecting a force exerted on said manual control means and for providing a signal representative of said detected force to said control means to result in a control signal from said motor control means to said motor which eliminates the effects of inertial forces and of operational non-linearities resulting from electromechanical connections of said active hand controller system, the improvement comprising:

counterbalance means for balancing said manual control means about said second axis of rotation to eliminate the effect of inertial forces.

10. Active hand controller as in claim 9 wherein said counterbalance means comprises a first weight and a second weight located on opposite sides of said second axis of rotation.

11. In an active hand controller system comprising manual control means for being controlled by a user by movement in a first plane and in a second plane, said second plane being perpendicular to said first plane, said manual control means connected to a moment cell having a center of rotation for detecting a first force exerted by a user in said first plane and a second force exerted by a user in said second plane, said moment cell connected through gimbal means having a first axis of rotation to a first motor and a second axis of rotation to a second motor for having said first motor exert a third opposing force on said manual control means in said first plane and said second motor exert a fourth opposing force on said manual control means in said second plane, said third force being related to said first force and said fourth force being related to said second force, and said third and fourth forces being representative of a mechanical hand controller means, the improvement comprising:

means for balancing inertial forces acting on said manual control means about said internal axis of rotation.

12. Active hand controller system of claim 11 wherein said means for balancing comprises a plurality of individual weights distributed about said center of rotation.

13. Active hand controller of claim 12 wherein said individual weights are secured by lever arms.

* * * * *